(12) United States Patent
Dillinger et al.

(10) Patent No.: US 9,557,163 B2
(45) Date of Patent: Jan. 31, 2017

(54) HEAD RESTRAINT AND METHOD FOR OPERATING A HEAD RESTRAINT

(71) Applicant: Johnson Controls GmbH, Burscheid (DE)

(72) Inventors: Thomas Dillinger, Ratingen (DE); Wei Lange-Mao, Hagen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 30 days.

(21) Appl. No.: 14/407,755

(22) PCT Filed: Jun. 13, 2013

(86) PCT No.: PCT/EP2013/062271
§ 371 (c)(1),
(2) Date: Dec. 12, 2014

(87) PCT Pub. No.: WO2013/186310
PCT Pub. Date: Dec. 19, 2013

(65) Prior Publication Data
US 2015/0123437 A1    May 7, 2015

(30) Foreign Application Priority Data

Jun. 15, 2012 (DE) .................. 10 2012 105 234
Aug. 22, 2012 (DE) .................. 10 2012 016 567

(51) Int. Cl.
*A47C 31/00* (2006.01)
*G01B 11/14* (2006.01)
(Continued)

(52) U.S. Cl.
CPC ............... *G01B 11/14* (2013.01); *B60N 2/002* (2013.01); *B60N 2/48* (2013.01); *B60N 2/4829* (2013.01); *B60N 2/4885* (2013.01); *G01V 8/10* (2013.01)

(58) Field of Classification Search
CPC ........... G01B 11/14; B60N 2/002; B60N 2/48; B60R 21/015
(Continued)

(56) References Cited

U.S. PATENT DOCUMENTS 5,748,473 A * 5/1998 Breed .................... B60N 2/002
 180/273
5,848,661 A * 12/1998 Fu .......................... B60N 2/002
 180/273
(Continued)

FOREIGN PATENT DOCUMENTS

DE 32 40 294 A1 5/1984
DE 37 30 210 A1 3/1989
(Continued)

OTHER PUBLICATIONS

International Search Report in PCT/EP2013/062271 dated Sep. 5, 2013, 6 pages.
(Continued)

*Primary Examiner* — Laurie K Cranmer
(74) *Attorney, Agent, or Firm* — Foley & Lardner LLP

(57) ABSTRACT

A head restraint for a vehicle seat has at least one sensor. The sensor is intended to determine the relative position of the head restraint in relation to the head of an occupant sitting in the vehicle seat. The sensor can include an optical sensor.

9 Claims, 1 Drawing Sheet

(51) Int. Cl.
*B60N 2/48* (2006.01)
*B60N 2/00* (2006.01)
*G01V 8/10* (2006.01)

(58) Field of Classification Search
USPC .................................................. 297/410, 391
See application file for complete search history.

(56) References Cited

U.S. PATENT DOCUMENTS

| | | | | |
|---|---|---|---|---|
| 6,746,078 | B2* | 6/2004 | Breed | B60N 2/002 297/216.1 |
| 7,794,012 | B2* | 9/2010 | Szablewski | B60N 2/48 297/216.12 |
| 8,201,883 | B2* | 6/2012 | Wuerstlein | B60N 2/002 297/216.12 |
| 8,296,018 | B2* | 10/2012 | Pedrero Iniguez | B60N 2/482 180/271 |
| 8,573,700 | B2* | 11/2013 | Togura | B60N 2/002 297/216.12 |
| 8,678,502 | B2* | 3/2014 | Osaki | B60N 2/002 297/216.12 |
| 2006/0175881 | A1* | 8/2006 | Akaike | B60N 2/482 297/216.12 |
| 2007/0267909 | A1* | 11/2007 | Truckenbrodt | B60N 2/002 297/410 |
| 2009/0062989 | A1 | 3/2009 | Sakai et al. | |
| 2009/0096468 | A1* | 4/2009 | Hirota | B60N 2/002 324/681 |
| 2010/0140992 | A1* | 6/2010 | Yamaguchi | B60N 2/0244 297/217.3 |

FOREIGN PATENT DOCUMENTS

| | | |
|---|---|---|
| DE | 195 47 333 A1 | 6/1997 |
| DE | 1020040 08 815 A1 | 9/2005 |
| DE | 1020060 23 584 A1 | 11/2007 |
| DE | 1120060 01 350 T5 | 4/2008 |
| JP | H06-061152 U | 8/1994 |
| JP | H07-111928 A | 5/1995 |
| JP | 2009-050461 A | 3/2009 |

OTHER PUBLICATIONS

Office Action dated Nov. 7, 2012 in German priority application No. 10 2012 016 567.6, 5 pages.
Office Action dated Jan. 5, 2016, in corresponding Japanese application No. 2015-516617, 4 pages.
International Preliminary Report on Patentability and Written Opinion of the International Searching Authority in corresponding International Application No. PCT/EP2013/062271 dated Dec. 24, 2014, 8 pages.

* cited by examiner

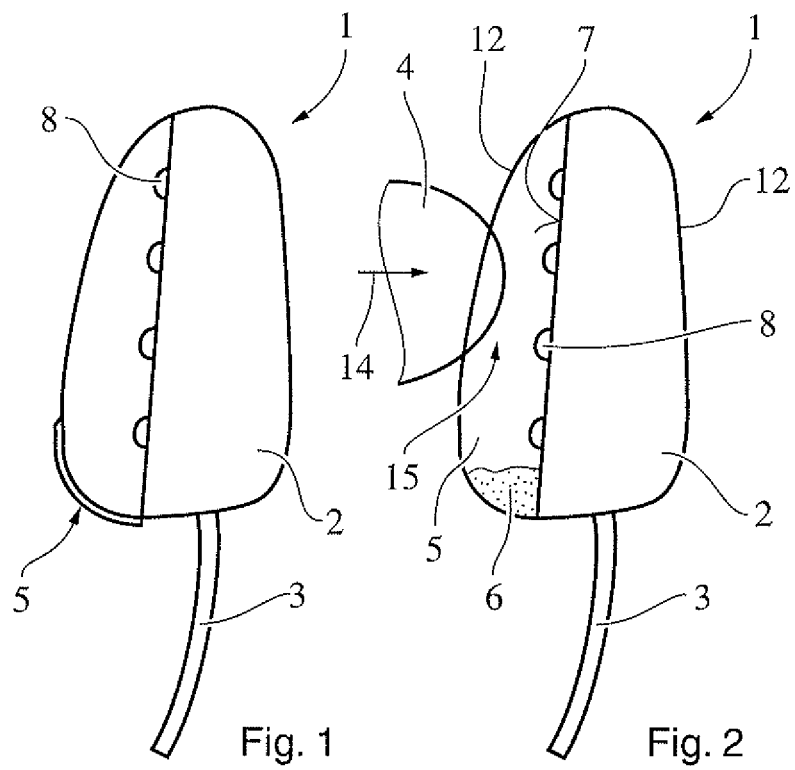
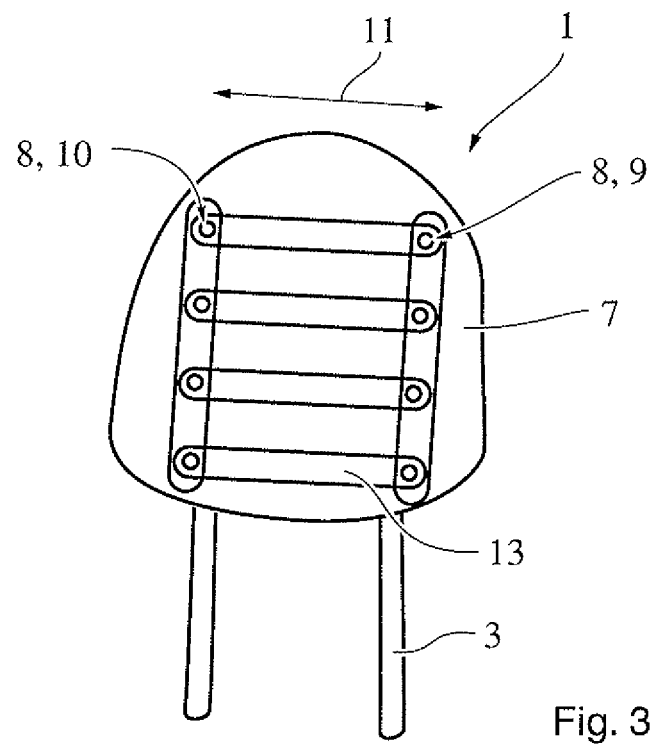

HEAD RESTRAINT AND METHOD FOR OPERATING A HEAD RESTRAINT

CROSS REFERENCE TO RELATED APPLICATIONS

The present application is a U.S. National Stage of International Application No. PCT/EP2013/062271 filed on Jun. 13, 2013, which claims the benefit of German Patent Application Nos. 10 2012 105 234.4 filed on Jun. 15, 2012 and 10 2012 016 567.6 filed on Aug. 22, 2012, the entire disclosures of all of which are incorporated herein by reference.

PRIOR ART

The present invention is based on a head restraint for motor vehicle seats. Such head restraints are generally known and serve to support the head of a vehicle occupant sitting on the motor vehicle seat. For the sake of safety of the vehicle occupants, correct positioning of the head restraint is important. This applies, in particular, to the correct height of the head restraint in relation to the vehicle occupant, as a result of which the risk of injury in the interior of a vehicle experiencing a rear-end impact, for example owing to a rear-end collision, can be considerably reduced. In order to set the correct head restraint position, the head restraints are therefore frequently of vertically adjustable design.

Experience has shown that despite the vertical adjustability of the head restraints, in many vehicles the head restraints are not arranged in the optimum position and therefore do not provide optimum protection in the event of an accident.

DISCLOSURE OF THE INVENTION

An object of the present invention is therefore to make available a head restraint which favors setting of the correct head restraint position with respect to a vehicle occupant and which can be manufactured comparatively easily and cost-effectively.

This object is achieved by means of a head restraint for a vehicle seat which head restraint has at least one sensor which is intended to determine the relative position of the head restraint in relation to a head of a vehicle occupant sitting on the vehicle seat, wherein the at least one sensor comprises an optical sensor.

The optical sensor can advantageously generate information indicating the position of the head restraint relative to the vehicle occupant's head. This information is preferably compared with reference data in order to determine whether the head restraint is in a correct position or whether the position of the head restraint can be optimized. It is conceivable that if a position of the head restraint which requires improvement is detected, a warning message is generated to inform the vehicle occupant and/or the head restraint is automatically moved into the correct position, for example by means of a motor. The use of an optical sensor also has the advantage that comparatively simple and cost-effective implementation is made possible. In contrast to mechanical sensors, the sensor does not experience wear during the use of the head restraint according to the invention, with the result that a long service life can advantageously be promoted and the susceptibility of the head restraint to faults can be considerably reduced.

Advantageous refinements and developments of the invention can be found in the dependent claims and the description with reference to the drawings.

According to one preferred embodiment there is provision that the sensor is provided for determining the position of a contact point of the vehicle occupant's head on a head restraint surface of the head restraint. The position of the contact point then permits a conclusion to be drawn about the relative position between the head and the head restraint.

According to a further preferred embodiment there is provision that the head restraint has a base element and a flexible head restraint element facing the head, wherein the at least one sensor is arranged between the base element and the flexible head restraint element.

According to a further preferred embodiment there is provision that the head restraint has a multiplicity of sensors which are preferably arranged on a front face of the base element facing the head restraint element. It is conceivable that the sensors are arranged distributed over the front face, and that sensor at which the contact point is detected enters into contact, with the result that the position of the sensor which is contacted stands for the position of the contact point. In this way, a location-determining functionality which is comparatively easy and cost-effective to implement can be realized for determining the relative position between the head and the head restraint.

According to a further preferred embodiment there is provision that the sensors comprise optical sensors. Here, each sensor comprises a light source, for example a light emitting diode (LED) which is arranged on an edge side of the base element, and a light detector, for example a photodiode, which is arranged on an opposite edge side of the base element, with the result that the light detector detects the light of the light source if the light beam is not interrupted. It is conceivable that in the case of a pressure acting on the head restraint as a result of the vehicle occupant's head, the flexible head restraint element is pressed in the direction of the base element in such a way that the light beam between the light source and the light detector is interrupted in the region of the contact point by the pressed-in head restraint element.

The sensors are preferably arranged in such a way that the various light beams run parallel with respect to one another and substantially horizontally. If one of the light beams is interrupted, a conclusion can therefore be drawn about the height of the head restraint in relation to the contact point or in relation to the vehicle occupant's head.

According to a further preferred embodiment there is provision that just a single light source, for example a light emitting diode, is provided, the light of which is distributed to various grooves by light distributors.

According to a further preferred embodiment there is provision that grooves are formed in the head restraint element on a rear side of the head restraint element facing the base element, wherein in each case a light source and a light detector are arranged in each groove. The head restraint element is preferably embodied in such a way that when a force is applied to the head restraint element by a vehicle occupant's head, the corresponding groove located at the height of the contact point is compressed, and the light detector located in this groove therefore can no longer receive any light from the light source which is also located in this groove. In this way the height of the contact point in relation to the head restraint can be determined. It would also be conceivable that the sensors additionally comprise pressure sensors, wherein that sensor at which the highest mechanical pressure is detected owing to the head bearing against it enters into contact. It would also alternatively be conceivable that simple contact sensors, for example of a pressure switch type, are additionally used, wherein that sensor to which a force is applied as a result of the head bearing against it closes or opens a circuit.

A further subject matter of the present invention is a vehicle seat component which has at least one sensor which serves as a contact sensor for detecting a seat occupation and/or as an operator control element, wherein the at least one sensor comprises an optical sensor. It is conceivable that the sensors described above are integrated for example into a seat surface of the vehicle seat, into a backrest of the vehicle seat and/or into an armrest of the vehicle seat, in order to detect whether a user has sat down on the vehicle seat and/or has pressed onto the vehicle seat, in particular with a part of his body. The optical sensor then serves as a contact sensor and is preferably respectively part of a photoelectric barrier.

Further details, features and advantages of the invention can be found in the drawings, and in the following description of preferred embodiments with reference to the drawings. The drawings illustrate here merely exemplary embodiments of the invention which do not restrict the essential inventive concept.

BRIEF DESCRIPTION OF THE DRAWINGS

FIG. 1 shows a schematic sectional view of a head restraint according to an exemplary embodiment of the present invention without an external application of force by a vehicle occupant's head, FIG. 2 shows a schematic sectional view of the head restraint according to the exemplary embodiment of the present invention with an external application of force by a vehicle occupant's head, and FIG. 3 shows a schematic perspective view of a head restraint according to an exemplary embodiment of the present invention without an external application of force by a vehicle occupant's head.

EMBODIMENTS OF THE INVENTION

In the various figures, identical parts are always provided with the same reference numbers and are therefore generally also each named or mentioned only once.

In FIGS. 1, 2 and 3, schematic views of a head restraint 1 according to an exemplary embodiment of the present invention are illustrated.

The head restraint 1 comprises a base element 2 which is attached to a backrest of a vehicle seat (not illustrated) by means of two securing rods 3. It is conceivable that the securing rods 3 are arranged in a vertically adjustable fashion in guide sleeves of the backrest or that the base element 2 is attached to the securing rods 3 in a vertically adjustable fashion. On a side facing the vehicle occupant's head 4, the head restraint 1 has a head restraint element 5. The head restraint element 5 has an, in particular, flexible upholstered material 6 which, in the event of contact with the head 4 (see FIG. 2) can be pressed elastically in the direction of the base element 2. The base element 2 and the head restraint element 4 are preferably each covered with a cover 12.

The base element 2 has a front face 7 facing the head restraint element 5, on which front face 7 a multiplicity of sensors 8 is arranged. Each sensor 8 comprises a light emitting diode 9 and a photodiode 10, wherein in each case a light emitting diode 9 and a photodiode 10 are always arranged opposite one another in a horizontal direction 11 on the front face 7. On a rear side of the head restraint element 5 facing the base element 2, the head restraint element 5 has grooves 13 through which the light of a light emitting diode 9 is incident on a photodiode 10, in parallel with the horizontal direction 11, if no force 14 originating from the vehicle occupant's head 4 is applied to the head restraint element 5 in the direction of the base element 2. If such a force 14 is applied to the head restraint element 5 (see FIG. 2), the head restraint element 5 is pressed in the direction of the base element 2 at the height of the contact region 15 between the head 4 and the head restraint element 5. As a result, the groove 13 located at the height of the contact region 15 is compressed, with the result that the light of the light emitting diode 9 located in the groove 13 can no longer arrive at the corresponding photodiode 10 which is likewise located in this groove 13. An evaluation unit evaluates the signals of the photodiodes 10 continuously, with the result that a failure of the light cone to occur in the region of this one photodiode 10 is detected. On the basis of the known position of this photodiode 10, conclusions are then drawn about the height of the contact region 15 and therefore the relative position between the head 4 and the head restraint 1 is determined.

This information is preferably compared with reference data in order to determine whether the head restraint 1 is in a correct position or whether the position of the head restraint 1 in relation to the position of the head 4 should be optimized. If a position of the head restraint 1 which requires improvement is detected, a warning message to inform the vehicle occupant is generated so that the vehicle occupant can manually optimize the position of the head restraint 1, and/or the head restraint 1 is automatically moved into the correct position by means of a height adjustment motor. It is also conceivable that during the manual adjustment of the head restraint height the position is monitored and a signal tone is output when the correct position is reached.

It is also conceivable that just a single light source 9, for example a light emitting diode, is arranged on the one side, the light of which light source 9 is distributed to the various grooves 13 by means of light distributors.

LIST OF REFERENCE NUMERALS

1 Head restraint
2 Base element
3 Securing rod
4 Head
5 Head rest element
6 Upholstered material
7 Front face
8 Sensor
9 Light emitting diode
10 Photodiode
11 Horizontal direction
12 Cover
13 Groove
14 Force
15 Contact region

The invention claimed is:

1. A head restraint for a vehicle seat, comprising:
at least one sensor configured to determine a relative position of the head restraint in relation to a head of a vehicle occupant sitting on the vehicle seat,
wherein the at least one sensor comprises an optical sensor,
wherein the head restraint has a base element and a flexible head restraint element assigned to the head,
wherein the at least one sensor is arranged between the base element and the flexible head restraint element, wherein at least one groove is formed in the head restraint element on a rear side of the head restraint element facing the base element, wherein a light source and a light detector of the at least one sensor are arranged in the groove.

2. The head restraint as claimed in claim 1, wherein the at least one sensor includes a multiplicity of sensors which are arranged on a front face of the base element facing the head restraint element.

3. The head restraint as claimed in claim 2, wherein a light beam is configured to emerge from each of the light sources, wherein the multiplicity of sensors are arranged in such a way that each of the light beams runs parallel with respect to one another and horizontally.

4. The head restraint as claimed in claim 1, wherein the light source and the light detector of the optical sensor act as a photoelectric barrier.

5. The head restraint as claimed in claim 4, wherein the light source and the light detector are arranged in such a way that a light beam emerging from the light source is incident on the light detector if no pressure is applied to the head restraint element by the vehicle occupant's head, and in that the light beam is interrupted if pressure is applied to the head restraint element by the vehicle occupant's head.

6. The head restraint as claimed in claim 5, wherein the light source comprises a light emitting diode which is arranged on an edge side of the base element, and wherein the light detector comprises a photodiode which is arranged on an opposite edge side of the base element.

7. The head restraint as claimed in claim 1, wherein a light beam is configured to emerge from the light source, wherein the head restraint element is configured such that when pressure is applied to the head restraint element by the head of the vehicle occupant, the groove that is located at a height of a contact point is compressed, and the light beam running in this groove is interrupted.

8. A vehicle seat having a seat part, a backrest and the head restraint as claimed in claim 1.

9. The head restraint of claim 1, wherein the at least one groove includes a multiplicity of grooves on the rear side of the head restraint element facing the base element.

* * * * *